US006554051B1

(12) United States Patent
Werner et al.

(10) Patent No.: US 6,554,051 B1
(45) Date of Patent: Apr. 29, 2003

(54) PHENOLIC RESIN AND BINDING AGENT FOR PRODUCING MOULDS AND CORES ACCORDING TO THE PHENOLIC RESIN-POLYURETHANE METHOD

(76) Inventors: Andreas Werner, Vohwinkelallee 41, D-40229 Dusseldorf (DE); Diether Koch, Stintenbergerstrasse 37, D-40822 Mettmann (DE)

( * ) Notice: Subject to any disclaimer, the term of this patent is extended or adjusted under 35 U.S.C. 154(b) by 0 days.

(21) Appl. No.: 09/486,844

(22) PCT Filed: Sep. 3, 1998

(86) PCT No.: PCT/EP98/05581

§ 371 (c)(1),
(2), (4) Date: Jul. 10, 2000

(87) PCT Pub. No.: WO99/11686

PCT Pub. Date: Mar. 11, 1999

(30) Foreign Application Priority Data

Sep. 4, 1997 (DE) .......................... 197 38 755

(51) Int. Cl.[7] ................................ B22C 1/22
(52) U.S. Cl. ................ 164/16; 164/526; 523/139; 523/145
(58) Field of Search ............... 164/456, 12, 16, 164/21, 526; 523/139, 145; 528/86

(56) References Cited

U.S. PATENT DOCUMENTS

| 3,485,797 A | | 12/1969 | Robins ................. 526/71 |
| 3,904,559 A | * | 9/1975 | Furness et al. ........... 523/143 |
| 4,852,629 A | * | 8/1989 | Fechter et al. ............. 164/16 |
| 5,101,001 A | * | 3/1992 | Henry et al. .............. 528/139 |
| 5,304,225 A | * | 4/1994 | Gardziella et al. ........... 51/298 |
| 5,607,986 A | | 3/1997 | Kim et al. ................ 523/141 |
| 5,856,375 A | * | 1/1999 | Chang et al. .............. 523/145 |
| 5,880,174 A | * | 3/1999 | Singh et al. ............... 523/142 |
| 5,880,175 A | * | 3/1999 | Archibald et al. ........... 523/142 |
| 5,908,914 A | * | 6/1999 | Dando et al. ............. 528/129 |

FOREIGN PATENT DOCUMENTS

| JP | 57187141 A | | 11/1982 | ......... B22C/1/22 |
| JP | 60-92037 | * | 5/1985 | ......... B22C/1/22 |
| JP | 63-142016 | * | 6/1988 | ......... B22C/1/22 |

* cited by examiner

Primary Examiner—M. Alexandra Elve
Assistant Examiner—Kevin P. Kerns
(74) Attorney, Agent, or Firm—David L. Hedden

(57) ABSTRACT

A method of preparing foundry shapes, e.g. molds and cores, by mixing a foundry aggregate with a foundry binder, shaping the mixture in a pattern, curing the mixture, and removing the mixture from the pattern. The foundry binder is a phenolic urethane binder that utilizes a phenolic resin prepared by reacting a phenol, an aldehyde, bisphenol-A-tar, and a divalent metal catalyst.

9 Claims, No Drawings

PHENOLIC RESIN AND BINDING AGENT FOR PRODUCING MOULDS AND CORES ACCORDING TO THE PHENOLIC RESIN-POLYURETHANE METHOD

CLAIM TO PRIORITY

This application claims the benefit of PCT/EP98/05581 filed on Sep. 3, 1998 and German Application 197 38 775.1 filed on Sep. 4, 1997.

FIELD OF THE INVENTION

This invention relates to a phenolic resole resin obtained by condensation of a phenol, an aldehyde, and bisphenol-A-tar. The invention also relates to phenolic urethane foundry binders made with the phenolic resins, the use of the binders in making foundry molds and cores, and the use of the cores and molds in the casting of metals.

BACKGROUND OF THE INVENTION

Today's foundries have many different processes to choose from for the manufacture of cores and molds. With core based manufacturing, synthetic resins are primarily used as binders. Among the known processes, the gas hardening processes, in particular the Ashland Cold Box Process described in U.S. Pat. No. 3,409,579, which is of outstanding commercial success.

The Ashland Cold Box Process consists of a two-component system, in which one component consists of polyols with at least two hydroxyl groups in the molecule, and the other component consists of polyisocyanates, with at least two isocyanate groups in the molecule. These two components, in a dissolved form, are mixed together with an aggregate (typically sand) and are cured through the addition of a catalyst.

U.S. Pat. No. 3,409,579 describes binders, which contain, as one component of a two-component system, a resin solution, and as the other component, a hardener. The resin component of the binder according to this patent consists of a phenolic resin of the benzylic ether type and a combination of organic solvents. The phenolic resin is obtained preferably through a reaction of phenols and formaldehydes, which is catalyzed by divalent metal ions dissolved in the reaction medium, as is described in U.S. Pat. No. 3,409,579 and in EP-A-0 183 782. Phenolic resins of the benzylic ether type (also described as resoles) differ from the novolaks which are condensed under acidic conditions, in that they have better solubility and lower viscosity, two properties which are of considerable importance with respect to their suitability for binder systems for the phenolic urethane process. Furthermore, phenolic resins of the benzylic ether type distinguish themselves in this process by higher reactivity.

The hardening component contains a liquid polyisocyanate with at least two isocyanate groups per molecule. These two components are thoroughly mixed with a refractory material (preferably quartz sand), and the mixture thus obtained is shaped in the desired form.

In U.S. Pat. No. 3,409,579, the shaped sand mix is cured by a gaseous amine, which is passed through it. In U.S. Pat. No. 3,676,392, the curing is achieved by a base with a pkB-value in the range of 7–11 (described by D. D. Perrin in Dissociation Constants of Organic Bases in Aqueous Solution, Butterworth, London, 1965). In both of these patents, the favored phenolic resin condensation products are from phenols with the general formula:

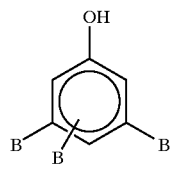

in which A, B and C are hydrogen, alkyl groups, alkoxy groups or halogen atoms, with aldehydes of the general formula R'CHO, in which R' is a hydrogen or an alkyl group with 1–8 carbon atoms. The condensation reaction of phenol (s) and aldehyde(s) occurs in the liquid phase, usually at temperatures under 130° C. in the presence of catalytic concentrations of metal ions dissolved in the reaction medium. The manufacture and characterization of the phenolic resins obtained in this way are described in detail in U.S. Pat. No. 3,485,797. The use of substituted phenols is described in EP-A-183 782. Especially preferred phenols in this regard are ortho-cresol and para-nonyl phenol.

The phenolic resin component of the binder in the phenolic urethane process is usually used, as already mentioned, in the form of a solution in one or more organic solvents. The second component of the well known binder involves an aliphatic, cycloaliphatic or aromatic polyisocyanate, preferably with 2–5 isocyanate groups per molecule. In addition, mixtures of polyisocyanates can be used. The polyisocyanates or their solutions in organic solvents are used in sufficient concentrations to achieve the hardening of the phenolic resins.

An existing problem of a benzylic ether polyol-polyurethane based binder is its oftentimes inadequate hot strength. A certain degree of thermal breakdown is desirable, in order that the molding material mixture can be removed more easily from the cast piece. However, premature thermal decomposition of the binder leads to the emergence of cracks in the molding material in which fluid metal can penetrate, forming so-called veins or leaf ribs. In addition, hot metal can wash away the molding material as so-called erosion. Finally, a refractory coating of the molding material can flake off from the rest of the molding material. One speaks in a case like this of scabbing. All these defects can be reduced or even avoided through binders with higher thermal stability.

In U.S. Pat. No. 4,546,124, it is proposed that the thermal stability of the phenolic resin be raised through alkoxylation. However, although this brings about a certain improvement, the problem is not yet completely solved. In U.S. Pat. No. 3,904,559, foundry binders are shown, in which the polyol component contains a mixture of bisphenol and a polyether polyol. EP-A-2 898 describes a polyol component for a binder system which is hardened at room temperature, which consists of a mixture of bisphenol and a phenolic terpene component. In EP-A-40 497 phenol-ketone resins are mentioned, which are obtained by reaction of phenols or thiophenols with ketones and aldehydes.

The use of bisphenol-A-tar as a raw material for binders with the hot box process is described in U.S. Pat. Nos. 3,318,840 and 5,607,986. These binders include a furan resin, furfuryl alcohol and polyvinyl acetate. The bisphenol-A-tar is used to achieve a higher tensile strength in the casting mixture. To be sure, the heat hardening hot box binders compared to the cold hardening binders of the phenolic urethane process exhibit a number of serious disadvantages. In particular, the production cycles are longer and along with this, the productivity is lower.

U.S. Pat. No. 4,337,344 describes the manufacture of phenolic resins with bisphenol-A distillation residues and formaldehyde under acidic catalysis. A resin obtained in this way is called a novolak resin. Sand is coated with this material at elevated temperatures. This coated sand is put into a molding tool together with hexamethylene tetramine and cured at temperatures of around 250° C. This process is known as Croning, or shell-mold process. In order to reduce the brittleness, in many cases thermoplastic additives are used. The addition of bisphenol-A-tar to such resins results in higher flexibility (lower brittleness and with it, lower vulnerability to tears). Unlike phenolic resole resins, novolac resins (Croning resins), after the curing with hexamethylene tetramine, thermosets, do not exhibit thermal deformation, but are brittle. Novalac and phenolic resole resins are different structurally, are cured with different curing catalysts involving different mechanisms, and their applications are also different.

SUMMARY OF THE INVENTION

The subject invention relates to phenolic resins prepared by the reaction of a phenol, an aldehyde, and bisphenol-A-tar. The invention also relates to the use of these phenolic resins in phenolic urethane binders, the manufacture of foundry molds and cores using the binder, and the use of the cores and molds to prepare metal castings.

It is known that cold box binders based on resole phenolic urethanes pass through a thermoplastic phase by heating, in which the urethane bonds dissociate (A. Knop, W. Scheib, Chemistry and Application of Phenolic Resins, Springer-Verlag Berlin, 1979, S. 57). Surprisingly, it was found that binders containing a phenolic resin made using the bisphenol-A-tar achieved a higher stability during and after the thermoplastic phase than conventional binders based only on phenols, i.e. there was no premature thermal breakdown encountered. This discovery was not expected, particularly since the exchange of pure bisphenol-A-tar for bisphenol-A tar led to no useful phenolic resin, because the phenolic resin with pure bisphenol-A separated from the solvents in the usual solvent combination.

DESCRIPTION OF THE PREFERRED EMBODIMENTS

The phenols used to make the phenolic resins have the general formula:

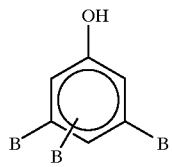

in which A, B and C are hydrogen, alkyl groups, alkoxy groups or halogen atoms, are described in U.S. Pat. No. 3,409,579, which is hereby incorporated by reference. Especially preferred phenols in this regard are ortho-cresol, para phenol, and nonyl phenol. The phenolic resins in the invention are preferably phenolic resole resins, most preferably phenolic resole benzylic ether resins.

The aldehydes used have the general formula R'CHO, in which R' is a hydrogen or an alkyl group with 1–8 carbon atoms. Examples of suitable aldehydes include formaldehyde, acetaldehyde, propionaldehyde, furfuraldehyde and benzaldehyde. The preferred aldehyde is formaldehyde in its aqueous form or in the form of paraformaldehyde.

The mixture of bisphenols and higher condensation and substitution products of the bisphenols, that are used in the manufacture of the phenolic resin components of the binders in the invention, are residuals from the distillation of bisphenol-A and are called from this point forward bisphenol-A-tar. Bisphenol-A-tar is a solid material at room temperature and has a deformation point of 70–80° C. The bisphenol-A-tar-components usually contain between 10 and 50% by weight 4,4'-isopropylidene diphenol (4,4' or p, p'-bisphenol), between 3 and 20% o-[1-(4-hydroxyphenyl)-1-methyl ethyl]-phenol (2,4' or o,p'-bisphenol) and between 0.1 and 0.5% by weight 2,2-isopropylidene diphenol (2,2' or o,o'-bisphenol). Also, between 1 and 10% by weight of phenol is found, as well as larger quantities of higher condensing products, namely dimerics, trimerics, and polymerics of the bisphenols as well as substituted binders. Usually bisphenol-A-tar with up to 40% by weight phenol and with up to 20% by weight water are combined, so that the product is also pumpable at temperatures below 100° C.

The condensation of phenol(s), aldehyde(s), and bisphenol A tar occurs in the liquid phase, usually at a temperature under 130° C. (typically 100° C. to 125° C.) in the presence of an alkaline catalyst or metal catalyst, such that the mole ratio of aldehyde to phenol is from 3:1 to 1:1, preferably about 1.8:1 to 1.2:1. The phenolic resins are preferably substantially free of water and are organic solvent soluble. The preferred phenolic resins used in the subject binder compositions are well known in the art, and are specifically described in U.S. Pat. No. 3,485,797 and EP-A-0 183 782, which are hereby incorporated by reference. These resins, known as benzylic ether phenolic resole resins, are the reaction products of an aldehyde with a phenol. They contain a preponderance of bridges joining the phenolic nuclei of the polymer, which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium, preferably zinc acetate and lead naphthenate.

The phenolic components can also contain, in addition to phenol, one or more substituted phenols. With this, many substituents are possible, as long as the substituent(s) do not impede the polymerization of the aldehydes with the phenol in the ortho- and para-positions.

For the composition of the phenolic resin in the invention, the bisphenol-A-tar is preferred in a quantity of 1 to 85% by weight in relation to the total quantity of phenol, aldehyde and bisphenol-A-tar being used, with 8 to 80% by weight being preferred, and 20 to 75% by weight being especially preferred. Instead of the technical bisphenol-A-tar, a mixture of substances manufactured in a different way can also be used with essentially the same composition of bisphenol-A-tar stated above.

In addition to the phenol, aldehyde and bisphenol-A-tar, hydroxyl compounds, such as alcohols, can also be added to the condensation reaction mixture. The advantage of using these compounds lies in their lower polarity and the correspondingly better solubility of the alkoxylated phenolic resins obtained with them in the solvents which are being used. The hydroxyl compounds are preferred in a molar ratio of hydroxyl compound to phenol of 0.04 to 1.75 to 1, with 0.1 to 1.5 to 1 being preferred, and especially preferred from 0.4 to 1.5 to 1.

Phenolic resins, which are used in the binder in the invention, must either be liquid or soluble in organic solvents. Solubility in organic solvents is desirable, in order to make possible a homogenous distribution of binders in the aggregate. The absence of water is for the most part desirable, since the reaction of the isocyanate-components with water causes an undesirable secondary reaction. With respect to the amount of water in the phenolic resin component, when we say water-free, that means less than 5% by weight, and preferably, less than 2% by weight of water.

By "phenol resin" or "phenolic resin" are meant the reaction product of phenols and bisphenols, as well as higher condensation products with aldehydes, in which the product of the reaction is a mixture of organic binders. The composition of the products is dependent on the specific initial substances chosen, the ratio of these products, and the reaction conditions. The type of catalysts, the time and the reaction temperature also play a part, as well as the presence of solvents and other substances. The reaction product, that is, the phenolic resin, is a mixture of various molecules and can contain in varying proportions addition products, condensation products and unconverted starting materials, such as phenols, bisphenols, and/or aldehydes.

The phenolic resin component of the binders is used as a solution in an organic solvent or a combination of organic solvents. Solvents are necessary in order to hold the components of the binders in a sufficiently low viscous state. This is necessary, among other reasons, in order to obtain a uniform coating of the aggregate and maintain their pourability. These solvents can involve apolar, aprotic solvents, like high-boiling point aromatic hydrocarbons (mostly in the form of mixtures) with a boiling point of >150° C., high-boiling-point aliphatic hydrocarbons, and esters of long-chain fatty acids. Examples of polar solvents include, among other things, esters with a sufficiently high boiling point, such as the "symmetrical" ester described in DE-A-27 59 262, in which both the acid functionality as well as the alcohol functionality exhibit a number of C-atoms lying in an equal range (some 6–13 C-atoms). Likewise a mixture of dimethyl esters of the C4–C6-dicarbon acids, which are described as "Dibasic Esters" or "DBE" for short has been proven effective. Cyclical ketones are also used as polar solvents.

The second component of the binder involves an aliphatic, cycloaliphatic or aromatic polyisocyanate, preferably with 2–5 isocyanate groups per molecule. Also mixtures of polymeric isocyanates can be used. Although all polyisocyanates can react with the phenolic resin in the form of an interlinked polymer structure, aromatic polyisocyanate is preferred and especially preferred here is polymethylene-polyphenylene-polyisocyanate.

The polyisocyanates or their solutions in organic solvents are used in sufficient concentrations to bring about the hardening of the phenolic resins, usually in a range of from 10 to 500% by weight, in relation to the weight of the phenolic resin. 20 to 300% by weight is preferred. As solvents for polyisocyanates, high-boiling-point aromatic and aliphatic hydrocarbons as well as high-boiling-point fatty acid esters are preferred, or if appropriate, mixtures of the mentioned substances.

The polyisocyanates are used in sufficient concentrations in the binder to cause the curing of the phenolic resin with an amine curing catalyst. In general, the ratio of NCO groups of the polyisocyanate to the OH groups of the phenolic resin is from 0.75:1.25 to 1.25:0.75, preferably about 0.9:1.1 to 1.1:0.9. The polyisocyanate is used in a liquid form. Solid or viscous polyisocyanates must be used in the form of organic solvent solutions, the solvent generally being present in a range of up to 80 percent by weight of the solution.

As useful additives, silane compounds are used, as described in EP-A-183 782. Additional useful additives involve the surface-active agents and acid derivatives for the improvement of the sand life, which are likewise described therein.

Molds and cores are made by mixing the binder with a foundry aggregate, working the mixture into a foundry mold or core, and then hardening the mixture. Various types of aggregate and amounts of binder are used to prepare foundry mixes by methods well known in the art. Ordinary shapes, shapes for precision casting, and refractory shapes can be prepared by using the binder systems and proper aggregate. Foundry shapes are prepared by introducing a foundry mix into a pattern. The foundry shapes are contacted with a volatile tertiary amine catalyst, and then are removed from the pattern. The amount of binder and the type of aggregate used are known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5%, preferably about 1% to about 5% by weight based upon the weight of the aggregate in ordinary sand-type foundry shapes.

Although the aggregate employed is preferably dry, small amounts of moisture, generally up to about 1.0 weight percent, more typically less than 0.5 weight percent, based on the weight of the sand, can be tolerated. This is particularly true if the solvent employed is non-water-miscible or if an excess of the polyisocyanate necessary for curing is employed, since such excess polyisocyanate will react with the water.

The hardening of phenolic resin-polyisocyanate binders can occur by two processes, namely cold-box and no-bake. With cold-box, the phenolic resin components and the isocyanate components are mixed with the aggregate, shaped, and then hardened by gassing with a volatile amine almost instantaneously. (See U.S. Pat. No. 3,409,579, which is hereby incorporated by reference.) With the no-bake processes, the phenolic resin component is usually added to a catalytic quantity of a liquid tertiary amine, the mixture thus obtained is mixed with the isocyanate components and the aggregate, shaped, and cured within minutes. (See U.S. Pat. No. 3,676,392, which is hereby incorporated by reference.)

The following examples should clarify the invention, without restricting it. The indication of quantities, which is shown as "GT" in the examples, stands for parts by weight, and trade names are shown with an "(H)".

EXAMPLES

Preparation of Phenolic Resins

In a reaction vessel which was provided with a condenser, cooler, thermometer and stirring device, phenol, formaldehyde, bisphenol-A-tar and zinc acetate were introduced in the quantities shown in Table I. The condenser was set on reflux. The temperature was brought in a steady climb to 105–115° C. and held at this temperature until a refractive index of 1.559 was reached. The condenser was switched over to atmospheric distillation, and the temperature was brought steadily over the course of an hour to 124–126° C.

The distillation continued until a refractive index of 1.594 was reached. Afterward, distillation was continued until a refractive index of 1.600 was reached. The yield came to 81–85% of the raw materials used.

TABLE I

|  | Example | | | | | |
|---|---|---|---|---|---|---|
|  | 1 | 2 | 3 | 4 | 5 | 6 |
|  | Comparison (not based on the invention) | | Based on the invention | | | |
| Phenol | 458.1 | 360.1 | 415.4 | 360.8 | 191.4 | 110.9 |
| Bisphenol-A-Tar |  |  | 53.8 | 118.1 | 306.5 | 449.7 |
| Bisphenol-A |  | 118.1 |  |  |  |  |
| Paraformaldehyde | 197.7 | 176.8 | 186.4 | 176.8 | 157.9 | 95.1 |
| Zn(OAc)$_2$ | 0.2 | 0.3 | 0.3 | 0.3 | 0.3 | 0.3 |

Preparation of Phenolic Resin Components

Using the phenolic resins of Table I, phenolic resin components were manufactured with the following components.

TABLE II

|  | Example | | | | | |
|---|---|---|---|---|---|---|
|  | 1 | 2 | 3 | 4 | 5 | 6 |
|  | Comparison | | Based on the invention | | | |
| Phenolic resin | 57.0 | 57.0 | 57.0 | 57.0 | 57.0 | 57.0 |
| DBE (H) | 10.0 | 10.0 | 10.0 | 10.0 | 10.0 | 10.0 |
| Solvesso 150 (H) | 29.7 | 29.7 | 29.7 | 29.7 | 29.7 | 29.7 |
| Amine or Amido Silane | 0.3 | 0.3 | 0.3 | 0.3 | 0.3 | 0.3 |

DBE = Dibasicmethylester
Solvesso 150 = $C_{10}$–$C_{13}$ -aromatic mixture

The comparison phenolic resin component of Example containing bisphenol-A instead of bisphenol A tar separated into phases with the cooling of the solution at room temperature. Consequently, no further tests were conducted with this solution.

Preparation and Testing of Casting Material-Binder Mixture

For the manufacture of the casting material-binder mixture, the previously described phenolic resin solutions were used together with the following isocyanate solution:

| 70 | Diphenyl methane diisocyanate (technical MDI) |
| 29.8 | Solvesso 150 (H) |
| 0.2 | Acid chloride (phosphoroxy chloride). |

Quartz sand, phenolic resin solution and isocyanate solution were thoroughly mixed in a blade mixer. With these mixtures, test specimens based on DIN 52401 and bars for the BCIRA-test were prepared and gassed at 4 bar gassing pressure with dimethyl isopropylamine and then purged for 10 sec with air. The mixture had the following ingredients:

| 100 | Quartz sand H 32 |
| 0.8 | Phenolic resin solution (1, 3, 4, 5, 6) |
| 0.8 | Isocyanate solution |

The tensile strength of the test specimens thus obtained was measured using the GF-method. The strength of the freshly manufactured mixture was measured immediately after the manufacturing process (initial strength) as well as after 1, 2 and 24 hours (ultimate strength ). In addition, the strength was tested of specimens, which had been stored at 98% atmospheric humidity for 24 hours. The results are summarized in Table III.

TABLE III

|  | Example | | | | |
|---|---|---|---|---|---|
|  | 1 | 3 | 4 | 5 | 6 |
|  | Stability | | | | |
|  | Comparison | Based on the invention | | | |
| Immediately | 155 | 135 | 145 | 115 | 145 |
| 1 hour | 265 | 240 | 240 | 255 | 305 |
| 2 hours | 275 | 265 | 255 | 260 | 370 |
| 24 hours | 370 | 345 | 350 | 385 | 425 |
| 24 h 98% atmospheric humidity | 315 | 290 | 290 | 330 | 335 |

From Table III it can be recognized that the cores manufactured according to the invention exhibit, in all cases, strengths which are comparable to those of cores manufactured with a conventional binders (Example 1).

Measurement of Thermal Stability

For determining the thermal stability of the previously-described binders, the so-called BCIRA Hot Distortion Test process was referred to (A. D. Morgan, E. W. Fasham: "The BCIRA Hot Distortion Tester for Quality Control in Production of Chemically Bonded Sands", Transactions of American Foundryman Society, 83 (1975) page 73). With this test, special test bars were manufactured under the same conditions as the test specimens in DIN 52401, heated with a gas flame, and the deformation of the test bars was measured over the timeline. The length of time until the test specimens can be bent is the hot distortion time, that is, the longer the time to the collapse of the test specimens, the greater their thermal stability. The interpretation of the BCIRA-test-curve is explained by G. C. Fountaine and K. B. Horton in Foundry-Practice 6/1992, Page 73. The results of the BICRA test are set forth in Table IV.

TABLE IV

|  | BCIRA-Test | | | | |
|---|---|---|---|---|---|
|  | Example | | | | |
|  | 1 | 3 | 4 | 5 | 6 |
|  | Comparison | Based on the invention | | | |
| Heat distortion time (sec) | 35.6 | 36.2 | 38.6 | 39.0 | 41.7 |

Table IV shows that small amounts of bisphenol-A-tar lengthen the hot distortion time and that the effect increases as the amount of bisphenol-A-tar increases.

We claim:
1. A process for preparing a foundry shape by the cold-box process which comprises:

(a) forming a foundry mix comprising:
  (1) a phenolic resin component comprising a phenolic resin prepared by the reaction of a condensation mixture consisting essentially of a phenol, an aldehyde, bisphenol-A-tar, and a divalent metal catalyst;
  (2) a polyisocyanate component; and
  (3) a foundry aggregate;
(b) forming a foundry shape by introducing the foundry mix obtained from step (a) into a pattern;
(c) contacting the foundry shape with a volatile tertiary amine catalyst; and
(e) removing the foundry shape of step (c) from the pattern.

2. The process of claim 1 wherein the bisphenol-A-tar used to prepare the phenolic resin comprises from 10 to 50% by weight 4,4'-bisphenol, 3 to 20% by weight 2,4'-bisphenol as well as dimers, trimers and polymers of bisphenol.

3. The process of claim 2 wherein the amount of bisphenol-A-tar used in preparing the phenolic resin is from 8 to 80% by weight based upon the total quantity of phenol, aldehyde and bisphenol-A-tar being used.

4. The process of claim 3 wherein the phenol used to prepare the phenolic resin is an unsubstituted phenol.

5. The process of claim 4 wherein the condensation mixture also contains a hydroxyl compound such that the molar ratio of hydroxyl compound to phenol is from 0.1:1 to 1.5:1.

6. The process of claim 5 wherein the phenolic resin is prepared with a divalent metal salt as catalyst.

7. The process of claim 6 wherein the divalent metal salt is selected from the group consisting of lead naphthenate and zinc acetate.

8. The process of claim 4 wherein the aldehyde used to prepare the phenolic resin is formaldehyde.

9. The process of claim 7 wherein the ratio of NCO groups of the polyisocyanate to the OH groups of the phenolic resin is from about 0.9:1.1 to 1.1:0.9.

* * * * *